(12) United States Patent
Liberman et al.

(10) Patent No.: US 6,248,381 B1
(45) Date of Patent: *Jun. 19, 2001

(54) METHOD OF RECONSTITUTING MEAT FROM TRIMS

(75) Inventors: Barnet L. Liberman, NY, NY (US); Peter H. Glidden, Sr., Whiting, ME (US)

(73) Assignee: Winterlab Limited, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/372,268

(22) Filed: Aug. 11, 1999

(51) Int. Cl.$^7$ .................................. A23L 1/31; A23P 1/10
(52) U.S. Cl. .................... 426/240; 426/272; 426/478; 426/513; 426/524; 426/641
(58) Field of Search .................. 426/240, 272, 426/478, 513, 524, 641, 523; 62/62, 64

(56) References Cited

U.S. PATENT DOCUMENTS

| | | | |
|---|---|---|---|
| 3,554,773 | * 1/1971 | Shults et al. | 426/240 |
| 3,728,136 | * 4/1973 | Langlands | 426/513 |
| 3,756,231 | 9/1973 | Ross | 100/232 |
| 3,761,283 | * 9/1973 | Snyder | 426/240 |
| 4,201,796 | * 5/1980 | Harkins | 426/523 X |
| 4,601,909 | 7/1986 | Nagoshi | 426/524 |
| 4,654,217 | * 3/1987 | Nagoshi | 426/524 |
| 4,657,768 | * 4/1987 | Nagoshi | 426/524 |
| 4,689,963 | 9/1987 | Sakai | 62/64 |
| 4,743,343 | 5/1988 | Sakai | 203/22 |
| 4,840,034 | 6/1989 | Liberman | 62/64 |
| 4,840,035 | 6/1989 | Liberman | 62/64 |
| 5,001,047 | 3/1991 | Liberman | 435/1 |
| 5,472,725 | * 12/1995 | Mendenhall | 426/524 X |
| 5,807,598 | * 9/1998 | Liberman et al. | 426/240 |

* cited by examiner

Primary Examiner—Arthur L. Corbin
(74) Attorney, Agent, or Firm—Cohen, Pontani, Lieberman & Pavane

(57) ABSTRACT

An improved method of reconstituting meat from trims of fish, poultry, pork or beef comprises the steps of freezing the trims, configuring the frozen trims and compressing the frozen trims with an external force to form purge on the outer surface thereof. The method does not require the trims to be defrosted and the use of any artificial binding agent for holding the reconstituted meat together, even during normal cooking conditions.

18 Claims, No Drawings

METHOD OF RECONSTITUTING MEAT FROM TRIMS

BACKGROUND OF THE INVENTION

1. Field of the Invention

The present invention relates to an improved method of reconstituting meat from trims of fish, poultry, pork, veal or the like. In particular, the present method enables meat to be reconstituted while still in a frozen state.

2. Description of the Related Art

Various methods have been devised to reconstitute meat into logs with various cross-sectional shapes, such as round or square, from trims or scrap pieces of beef, veal, pork, fish, poultry or the like for maximizing recovery of meat products therefrom. One known method of reconstituting meat makes use of binding agents for holding pieces of trims together so that the reconstituted meat does not fall apart during cooking. The known method includes the steps of coating fresh, i.e. not previously frozen, trims with a commercially available binding agent or binder, packing the trims in a mold, then allowing the binding agent to cure at about 35° F. for one hour. An example of a commercially available binder contains 0.5% trans-glutaminase, 2.5% sodium polyphosphate, 2.5% anhydrous sodium pyrophosphate, 2.0% sillicon dioxide, and 92.5% casein. Another example of a binding agent contains 75.0% protein (from milk and/or egg) and 25.0% calcium chloride and/or sodium chloride.

However, the conventional binding agents added to the reconstituted meat are "chemicals" that many consumers deem undesirable for consumption. In addition, the binding agent sometimes gives the reconstitute meat an "unnatural" resiliency or flavor. Thus, adding binding agents decreases the marketability of the reconstituted meat.

U.S. Pat. No. 5,807,598 ('598 patent) discloses methods of reconstituting meat absent conventional binding agents. The patent teaches the uses of the "purge", i.e. the natural fluid released from ruptured cells of a previously frozen animal tissue when defrosted, which typically collects on the outer surface of the defrosted meat, to substitute for the conventional binding agent. The "purge" contains an adequate amount of cellular protein, which functions as a "glue" by, for example, becoming denatured and cross-linked and gelatinous and forms an adhesive or cohesive bond between adjoining trims such that the meat trims are joined, adhered or otherwise held together. Through the methods described in the '598 patent, the reconstituted meat stays together even under cooking conditions.

While the methods disclosed in the '598 patent make the use of conventional binding agents unnecessary, they require the meat trims to be first frozen and then defrosted to produce an adequate amount of "purge". Once the meat trims are defrosted, they have to be frozen again for storage.

The disadvantages of the methods taught by the '598 patent are many-fold. First, the "purge" is produced through a freeze-defrost cycle, that is likely to cause damage to a large number of cells, thereby affecting the qualities of the meat such as, for example, appearance, taste, resiliency and aroma. Second, during the freeze-defrost cycle, temperature must be raised above the freezing point of the "purge" to produce the "purge". Since the higher the temperature is, the more bacteria will grow, raising temperature thus reduces freshness or tastiness of the meat. Third, it takes a relatively long time for the frozen meat to be defrosted. Fourth, the additional freezing step after defrosting not only causes further degradation of the meat, but also requires extra time and labor during manufacturing thereby increasing production cost.

Thus, it is desirable to reconstitute meat products through a simple and convenient process that minimizes the damage of the cells and preserves the freshness of the meat products.

SUMMARY OF THE INVENTION

Accordingly, an object of the present invention is to provide a method for reconstituting meat from trims or scrap pieces of fish, poultry, beef or pork or the like such that the reconstituted meat is closely similar to a whole-meat product in terms of its qualities such as appearance, taste, resiliency and aroma.

Another object of the invention is to provide a method of reconstituting meat which does not require the use of any binder or binding agent, and yet the reconstituted meat does not fall apart during cooking. In particular, the method does not require the meat trims to be defrosted during the meat reconstituting process.

An embodiment of the method of reconstituting meat in accordance with the present invention includes the steps of:

a. freezing the trims;

b. configuring the frozen trims to form a preselected shape; and c. compressing the frozen trims at a temperature below the freezing point under a preselected pressure for a preselected period.

The various features of novelty which characterize the invention are pointed out with particularity in the claims annexed to and forming a part of the disclosure.

DETAILED DESCRIPTION OF THE PRESENTLY PREFERRED EMBODIMENTS

As used herein the term "meat" is intended to include fish, shell-fish, poultry, beef, veal, pork including ham, various game meats such as venison, liver meat and any other type of animal product commonly referred to as meat or fish.

As used herein, the term "trims" is intended to include not only pieces of meat trimmed from a larger piece, but also to include other small pieces such as scraped, ground, flaked meat or the like.

As used herein, the term "reconstituted meat product" is a product comprising a plurality of small pieces or bits of meat, i.e. trims as above defined, which are held together to form a larger product such as, for example, a portion size product.

As used herein, the term "freezing point" means a freezing point at an atmospheric pressure.

As disclosed in U.S. Pat. No. 5,807,598, the reconstitution of meat trims can be accomplished using the "purge" produced by a freeze-defrost cycle as a natural binder to hold the meat trims together. In contrast, the present meat reconstituting process does not require such freeze-defrost cycle to produce the "purge". Rather, the "purge" is produced by applying external forces to the frozen trims. Since the freezing point of the "purge" decreases as the pressure increases, the "purge" can be produced at a temperature below the freezing point of the trims when the pressure is increased, i.e., the step in the '598 patent of defrosting the trims for producing the "purge" can be eliminated by exerting a pressure on the frozen trims. The production of the "purge" is thus accomplished by raising pressure rather than by raising temperature.

In accordance with a preferred embodiment of the present invention, the first step of preparing a piece of reconstituted meat from the trims of fish, poultry, beef, pork or the like is to freeze the trims of such products, if they are not yet frozen, to about −15° F., for example. This produces a minimal but yet adequate amount of ruptured meat cells to produce sufficient purge to bind the trims. While this initial freezing step may be accomplished by means of a blast freezer or any other conventional freezer, preferably, the trims are frozen using the "cooled-brine methods" (TruFresh®) disclosed in U.S. Pat. Nos. 4,601,909; 4,654,217; 4,657,768; 4,689,963; 4,743,343; 4,840,034; 4,840,035 and 5,001,047, the contents of which patents are incorporated herein by reference in their entireties. As described therein, these cooled-brine methods, unlike conventional freezing methods, advantageously maintain the freshness or tastiness of the meat by maintaining maximum cellular integrity of the meat tissue and minimizing the number of ruptured cells during the freezing process.

Although brine solutions of various compositions, as disclosed in the aforementioned cooled-brine method patents may be used, at least about 0.005% by weight of cruciferous oil is preferably included in the brine. Preferably, about 0.005% to 0.018% by weight of cruciferous oil such as rapeseed oil should be used. Alternatively, the amount of cruciferous oil may be selected such that a maximum amount of the oil is dissolved in the brine. Presently preferred brine composition include, by weight, bout 43.18% water, about 44.06% propylene glycol, about 12.75% calcium chloride, and about 0.01% rapesed oil. The temperature of the brine should be between about −22° and −46° F., and preferably between about −37° and −41° F.

After the initial cell rupturing step such as by freezing, the frozen meat trims are pressed by an external force to produce the requisite amount of purge to bind these trims together. The amount of purge produced should be at least about 3% by weight, but most preferably about 4–6% by weight so as to minimize the degradation to the meat.

While any method and device for reconstituting meat trims by external forces are applicable for the intended purpose, a commercially available pressing machine, such as, for example, Ross Presses including Ross Uniform 914 Press, manufactured by Ross Industries, Inc, Midland, Va., and devices disclosed in U.S. Pat. No. 3,756,231 to Ross, are preferred. The properties and methods of operation of these machines are described in the manufacturer brochures or the U.S. Pat. No. 3,756,231, the contents of which are herein incorporated by references in their entireties. As disclosed in the manufacturer brochures, Ross Presses are operated under dwell-timing and pressure control circuitry, which meters the amount of time the food product is under pressure. The operator turns the dial control to the predetermined setting (0–100), based upon the mold size.

In operation, the frozen meat trims are removed from the brine as above described and stored at a temperature between about 0 to 15° F. The Ross Press machine is set at a preselected dwell time such as 20 seconds and a preselected pressure such as 1000 psi. Then a desired amount of frozen meat trims to be formed into reconstituted meats are placed in the machine hopper and the machine is turned on. Since the freezing point of the trims decreases as the pressure increases, the trims melt causing the formation of the "purge", under the preselected pressure, without raising temperature. The frozen meat trims are thus bound together by the "purge" produced under the preselected pressure. After the preselected dwell period, the pressure on the formed meat log is removed, the freezing point of the trims and the "purge" increases and the trims and purge accordingly freeze without lowering the temperature. It will be obvious from the above description that the temperature of the trims during storage must be below the freezing point of the trims and "purge" at atmospheric pressure and above the freezing point of the trims and "purge" at the elevated pressures of the press machine.

It is noted that the duration, pressure and temperature of this compress-forming step, which can be readily adjusted, depend on the size, weight, surface area and/or desired density of the reconstituted meat. Such duration, pressure and temperature should be chosen so as to maintain the integrity of the meat and minimize degradation of the cells while producing sufficient amount of "purge". It is preferred that the frozen meat trims are pressed at temperatures below the freezing point of the trims and "purge", for example, about 0–15° F., under a pressure of, preferably about 200 to 1500 psi for a period of time, preferably about 6–60 seconds.

Before this compressing step, if desired (although optional in view of the teachings of the present invention), the trims may be treated by placing on the outside surfaces a minimal amount of a binding agent (e.g. about 1% by weight) such as, for example, calcium chloride, sodium chloride, cell adhesive molecules such as fibronnectin or collegen or the like, and/or ground dehydrated bone of the meat being processed, to further enhance the cohesive bonds between adjoining trims. These trims, either treated or untreated, may then be configured to form a desired or preselected size and shape by, for example, placing or arranging the trims inside at least a portion of a mold or any structure which defines, at least in part, the shape of the reconstituted meat. The mold may be in the shape of, for example, a fish fillet, in the case where the reconstituted meat comprises trims of a salmon or other fish or shaped like a steak or hamburger patty if the meat is beef. In the case of tuna trims, the mold may resemble a tuna steak.

When Ross Presses are used in the compress-forming step, standard molds or custom made molds provided by the manufacturer of Ross Presses may be used.

After the compress-forming step and removal of the reconstituted meat log from the machine, the reconstituted meat products are preferably placed at a temperature between about 0 to 15° F. for storage.

The reconstituted meat may be cut into portions having the desired size and weight at a temperature, for example, below 10° F., for users such as restaurateurs. The reconstituted meat may be cut using any suitable cutting machines such as, for example, Bandsaw made by AEW or Butcherboy by Butcherboy.

To add flavor, to decontaminate the surfaces of the portion and/or to increase the bodily integrity of the reconstituted meat, the portions (preferably while still frozen) may be seared over flame or in a broiler heated to about 600 to 800° F., for about 2.0 to 3.0 seconds, depending on the shape and size of the portions. It is believed that the searing step causes the tissue fibers at the surface of each portion to interlink thereby enhancing the surface strength of the portions. Optionally, these portions may also be seared through deep-frying, e.g., immersed in boiling oil (preferably, vegetable oil such as sesame oil), for a period of about 10 to 60 seconds. Alternatively or in addition thereto, the portions may be charmarked by passing under charring rings having a temperature of about 1,200 to 1,500° F. for about 2.0 to 3.5 seconds, whereby the charring rings rollingly contact the reconstituted meat surface to mark them as if they have char-grilled. The char-marking operation causes the tissue fibers in contact with the rings to desiccate through liquefaction or liquification of the component carbohydrates and/or proteins of the tissue fibers. It is believed that the desiccated tissue fibers and therefore more able to maintain the structural integrity of the reconstituted meat. By char-marking the portions in a crisscross manner, the desiccated tissue fibers act as a reinforcing "net" for the reconstituted meat. Preferably, after any of these searing and/or charmarking operations, the portions is immediately cooled for a period of between about 1.0 and 5.0 minutes to a surface temperature of between about 30 and 50° F. The portions are then placed in gas-impermeable (or vacuum-sealable) packages, e.g. bags, which are then vacuum sealed.

It is noted that these searing and/or char-marking operations are for treating only the outside surfaces of the portions and are not intended to cook through the portions.

Since the portions and their component trims may have collected bacteria during the reconstitution process, they should be pasteurized or sterilized. The pasteurization process may be performed either before or after the portions are placed in vacuum sealable packages. Pasteurization is preferably performed by irradiation such as, for example, by an electronic pasteurization device capable of sending X-ray, γ-ray or E-beam (electron beam) through the thickness of each portion so as to ensure the destruction of all (or a substantial amount of) bacteria, including those residing at the cohesive bonds between the adjoining trims. The packaged portions may thereafter be stored in a conventional freezer environment at about −15° ±5° F. for shipment to end-users such as, for example, restaurants, caterers, retail establishments or retail consumers. Thereafter, the end-users may prepare or cook the reconstituted meat in any number of ways, e.g., boil in a bag, microwave in a bag, broil over direct flame bike or pan fry (of course, without the bag).

It has been found that the reconstituted meat made in accordance with the present invention does not fall apart during normal cooking conditions. Moreover, the reconstituted meat is as tasty as whole meat and has qualities that are essentially indistinguishable from those of whole meat.

While it is presently contemplated to form the reconstituted meat product form trims, all of which are of the same type of meat, e.g. beef, pork, salmon or tuna, it is within the contemplation of this invention to form reconstituted meat products from a blend of meats, i.e., from trims from different meats such as, for example, beef and pork, and unless otherwise expressly limited, the trims should be construed to include such blends.

The invention is not limited by the embodiments described above which are presented as examples only but can be modified in various ways within the scope of protection defined by the appended patent claims.

We claim:

1. A method of reconstituting a piece of meat product from a plurality of meat trims, comprising the steps of:
   a. freezing said plurality of trims to rupture meat cells;
   b. configuring said frozen trims to form a preselected shape; and
   c. compressing said configured trims with an external force at a temperature below the freezing point of said frozen trims under a preselected pressure for a preselected period so as to cause at least 3% purge by weight to be formed on the outer surfaces of said frozen trims for holding said frozen trims together.

2. The method of claim 1, wherein said trims are frozen in a cooled brine containing at least about 0.005% by weight of a cruciferous oil.

3. The method of claim 2, wherein said cooled brine contains from about 0.005% to about 0.018% by weight of a cruciferous oil.

4. The method of claim 2, wherein said cruciferous oil is rapeseed oil.

5. The method of claim 2, wherein the temperature of said cooled brine is between about −22° and −46° F.

6. The method of claim 2, wherein the temperature of said cooled brine is between about −37° and −41° F.

7. The method of claim 1, wherein said external force is applied with a press.

8. The method of claim 1, wherein said frozen trims are compressed at a temperature between about 0° and 15° F.

9. The method of claim 1, wherein said frozen trims are compressed under a pressure between about 200 and 1,500 psi.

10. The method of claim 1, wherein said frozen trims are compressed for a period between about 6 and 60 seconds.

11. The method of claim 1, further comprising the steps of searing an outside surface of said compressed trims.

12. The method of claim 1, further comprising the steps of char-marking said compressed trims.

13. The method of claim 1, further comprising the step of applying a binding agent to outside surfaces of said frozen trims prior to the step of configuring said frozen trims.

14. The method of claim 13, wherein said binding agent is calcium chloride.

15. The method of claim 13, wherein said binding agent is sodium chloride.

16. The method of claim 13, wherein said binding agent is ground dehydrated bone.

17. The method of claim 1, further comprising the step of pasteurizing the compressed trims by irradiating said compressed trims with one of X-ray and electron beam.

18. A method of reconstituting a piece of meat product from a plurality of meat trims, comprising the steps of:
   a. freezing said plurality of trims to rupture meat cells;
   b. configuring said frozen trims to form a preselected shape; and
   c. compressing said configured trims in a press at a temperature between about 0° and 15° F. under a pressure between about 200 and about 1,500 psi for a period between about 6 and 60 seconds so as to cause at least 3% purge by weight to be formed on the outer surfaces of said frozen trims for holding said frozen trims together.

* * * * *